United States Patent
Jiang et al.

(10) Patent No.: US 12,099,165 B1
(45) Date of Patent: Sep. 24, 2024

(54) BIFUNCTIONAL AND FLEXIBLE HYDROGEL OPTICAL FIBER, PREPARATION METHOD AND APPLICATION THEREOF

(71) Applicant: Sichuan University, Sichuan (CN)

(72) Inventors: Nan Jiang, Sichuan (CN); Guoliang Ying, Sichuan (CN); Hongze Li, Sichuan (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 18/656,271

(22) Filed: May 6, 2024

(30) Foreign Application Priority Data

Jan. 25, 2024 (CN) .......................... 202410105277.4

(51) Int. Cl.
*G02B 1/04* (2006.01)
*C08J 3/075* (2006.01)

(52) U.S. Cl.
CPC .............. *G02B 1/046* (2013.01); *C08J 3/075* (2013.01)

(58) Field of Classification Search
CPC .................................. G02B 1/046; C08J 3/075
See application file for complete search history.

(56) References Cited

U.S. PATENT DOCUMENTS

| 11,143,815 B1 * | 10/2021 | Butt ................ G02B 6/262 |
| 2013/0302869 A1 * | 11/2013 | Erickson ............ G02B 6/00 435/257.1 |
| 2018/0340174 A1 | 11/2018 | Lundorf et al. |
| 2019/0192691 A1 | 6/2019 | Barrett et al. |
| 2023/0174786 A1 | 6/2023 | De Miguel et al. |

FOREIGN PATENT DOCUMENTS

| CN | 101139361 A | 3/2008 |
| CN | 112955124 A | 6/2021 |
| WO | 2021161064 A1 | 8/2021 |
| WO | 2022270549 A1 | 12/2022 |
| WO | 2004063036 A1 | 7/2024 |

\* cited by examiner

*Primary Examiner* — Sung H Pak (57) ABSTRACT

This application relates to a bifunctional and flexible hydrogel optical fiber, a preparation method and an application thereof. Raw materials of a fiber core include polyethylene glycol diacrylate (PEGDA), methacrylamide, 2-hydroxyethyl methacrylate (HEMA) and 2,2-diethoxy-phenylacetophenone (DMPA); raw materials of an intermediate fiber layer include *Synechococcus* cells, PEGDA, gelatin methacrylate (GelMA), anhydrous strontium chloride and DMPA; and raw materials of a cladding include PEGDA, methacrylamide, sodium alginate and DMPA. A continuous and controllable direct oxygen supply function is provided through an optical fiber structure.

20 Claims, 9 Drawing Sheets

FIG. 1

Mix raw materials of a fiber core, raw materials of an intermediate fiber layer and raw materials of a cladding to obtain a fiber core gel solution, an intermediate fiber layer gel solution and a cladding gel solution, respectively — S1

Perform three-coaxial 3D biological printing on the fiber core gel solution, the intermediate fiber layer gel solution and the cladding gel solution using a three-layer coaxial needle to obtain a hydrogel optical fiber — S2

Perform UV light crosslinking on an oxygen sensing membrane and a tip of a hydrogel optical fiber to obtain an optical fiber sensor — S1

FIG. 4

Dissolve PtOEP in THF, and mix a mixture with dimethylsiloxane to obtain a glue solution — S101

Uniformly spin-coat with the glue solution on a glass slide, followed by drying overnight to obtain an oxygen sensing membrane — S102

Immobilize the oxygen sensing membrane on a tip of a hydrogel optical fiber by UV light crosslinking to obtain an optical fiber sensor — S103

BIFUNCTIONAL AND FLEXIBLE HYDROGEL OPTICAL FIBER, PREPARATION METHOD AND APPLICATION THEREOF

CROSS-REFERENCE TO RELATED APPLICATIONS

This application claims priority of Chinese Patent Application No. 202410105277.4, filed on Jan. 25, 2024, the entire contents of which are incorporated herein by reference.

TECHNICAL FIELD

This application relates to the technical field of optical fiber sensing, and in particular to a bifunctional and flexible hydrogel optical fiber, a preparation method and an application thereof.

BACKGROUND

Cerebral hypoxia caused by cerebral lesions or craniocerebral trauma can cause brain tissue dysfunction to varying degrees and irreversible injury, seriously harming human health. Therefore, the real-time monitoring of an oxygen content in brain tissue and the timely and appropriate oxygen supply are effective treatment means to reduce brain tissue injury and occurrence of patients and prevent neurological complications. Currently, optical oxygen sensors used for human tissue detection are mainly divided into a wearable type, an injection type, an implantable type and an interventional type. In recent years, an optical fiber photochemical sensor has attracted more and more attention because of its high sensitivity and high selectivity. The oxygen content in brain tissue can be determined according to the change of fluorescence intensity or fluorescence lifetime by applying a fluorescence probe on one end of the optical fiber. The fluorescence chemical sensor can be continuously used for a long time after calibration once because it does not consume a substance to be detected, and has the advantages of high selectivity and sensitive reaction at the same time. However, the commonly used optical fiber material is made of glass or plastic, which is easy to cause injury to brain tissue, and its large size and mechanical properties are not suitable for the long-term use of flexible brain tissue. Therefore, how to construct a flexible optical fiber photochemical oxygen sensor is of great significance to realize the continuous real-time detection of oxygen contents in different regions of brain tissue.

The commonly used methods for supplying oxygen to brain tissue in clinic include oxygen inhalation, intubation, ventilator, hyperbaric oxygen chamber, etc. However, these methods require the use of human lungs for gas exchange, which is not only complicated and expensive, but also not suitable for patients with respiratory tract injury. Although a liquid oxygen supply method (intravenous drip) can quickly improve the symptoms of human hypoxia at present, it is not suitable for patients with impaired cerebral blood supply function, and it is difficult to realize oxygen supply in specific areas. However, active biological oxygen carriers generally have high biocompatibility, which are suitable for continuous direct supply in vivo. Meanwhile, recent studies have found that a photosynthetic cell is an ideal carrier for active oxygen release, and existing studies have demonstrated that the photosynthetic cell can continuously supply oxygen to cardiac cells, which is beneficial to the treatment of coronary artery diseases caused by myocardial ischemia. Although studies have demonstrated that the implantation of photosynthetic cells does not affect the activity of cardiac cells themselves, this method requires the implantation of a light source in vivo. Therefore, the difficulty of realizing continuous and controllable direct oxygen release at present lies in how to solve the problem of light source and ensure the stability of oxygen-producing organisms.

Since the detection of an oxygen content in brain tissue and an oxygen supply process are independent in clinic, and the current sensor for detecting an oxygen content in brain tissue only has a single oxygen measurement function, it is difficult to timely supply oxygen to the detected brain tissue lesions, while the conventional blood oxygen supply method is not suitable for patients with insufficient cerebral blood supply or impaired blood supply function. Therefore, the development of a novel oxygen sensor combining the functions of real-time detection of oxygen contents in different regions of brain tissue with continuous and controllable direct oxygen supply is of great significance for clinical diagnosis and treatment of brain tissue hypoxia-related diseases.

SUMMARY

This application provides a bifunctional and flexible hydrogel optical fiber, a preparation method and an application thereof, to solve the technical problem that the current oxygen sensor in the prior art is difficult to combine the functions of real-time detection of oxygen contents in different regions of brain tissue with continuous and controllable direct oxygen supply.

In a first aspect, this application provides a bifunctional and flexible hydrogel optical fiber, having a three-layer coaxial optical fiber structure formed by a fiber core, an intermediate fiber layer and a cladding. Raw materials of the fiber core include polyethylene glycol diacrylate (PEGDA), methacrylamide, 2-hydroxyethyl methacrylate (HEMA) and 2,2-diethoxy-phenylacetophenone (DMPA);

raw materials of the intermediate fiber layer include *Synechococcus* cells, PEGDA, gelatin methacrylate (GelMA), anhydrous strontium chloride and DMPA; and raw materials of the cladding include PEGDA, methacrylamide, sodium alginate and DMPA.

Alternatively, the raw materials of the fiber core include, in mass fraction, 10%-40% of PEGDA, 30%-50% of methacrylamide, 10%-40% of HEMA, 0.3%-1.2% of DMPA, and the rest of ultrapure water.

Alternatively, the raw materials of the intermediate fiber layer include, in mass fraction: 0.3%-3% of *Synechococcus* cells, 10%-30% of PEGDA, 10%-50% of GelMA, 0.5%-3% of anhydrous strontium chloride, 0.3%-1.2% of DMPA, and the rest of ultrapure water.

Alternatively, the raw materials of the cladding include, in mass fraction: 10%-30% of PEGDA, 5%-20% of methacrylamide, 1%-2% of sodium alginate, 0.3%-1.2% of DMPA, and the rest of ultrapure water.

Alternatively, a thickness ratio of the fiber core, the intermediate fiber layer, and the cladding is 1-3:1-3:1-3.

In a second aspect, this application provides a preparation method for a hydrogel optical fiber according to the first aspect, including the steps of:

mixing raw materials of a fiber core, raw materials of an intermediate fiber layer and raw materials of a cladding to obtain a fiber core gel solution, an intermediate fiber layer gel solution and a cladding gel solution, respectively; and performing three-coaxial 3D biological printing on the fiber core gel solution, the intermediate fiber layer gel solution and the cladding gel solution using a three-layer coaxial needle to obtain a hydrogel optical fiber.

In a third aspect, this application provides a bifunctional and flexible hydrogel optical fiber sensor, including a hydrogel optical fiber according to the first aspect, and an oxygen sensing membrane connected to one end of the hydrogel optical fiber.

In a fourth aspect, this application provides a preparation method for an optical fiber sensor according to the third aspect, including:

performing ultraviolet (UV) light crosslinking on an oxygen sensing membrane and a tip of a hydrogel optical fiber to obtain an optical fiber sensor, a raw material of the sensing membrane being polydimethylsiloxane (PDMS) supported platinum octaethylporphyrin (PtOEP).

In a fifth aspect, this application provides a real-time detection system for an oxygen content, including a fluorescence detection device and an optical fiber sensor according to the third aspect, the fluorescence detection device being fixedly connected to the optical fiber sensor.

Alternatively, the fluorescence detection device includes an optical splitter, a light source and a spectrometer, the optical splitter including a first interface, a second interface and a third interface, the first interface being communicated with the light source to realize the excitation of a green light source or a red light source;

the second interface being connected to the spectrometer to detect an intensity of an emitted light; and the third interface being connected to the optical fiber sensor.

Compared with the prior art, the above technical solutions provided by the examples of this application have the following advantages.

The example of this application provides a bifunctional and flexible hydrogel optical fiber. A three-layer coaxial optical fiber structure is designed, including a fiber core, an intermediate fiber layer and a cladding. It is defined that the fiber core includes PEGDA, methacrylamide, HEMA and DMPA; the intermediate fiber layer includes *Synechococcus* cells, PEGDA, methacrylamide, GelMA, anhydrous strontium chloride and DMPA, and the cladding includes PEGDA, methacrylamide, sodium alginate and DMPA. Photosynthetic cells such as *Aegagropila* cells are introduced into the intermediate fiber layer and combined with anhydrous strontium chloride, so that a photosynthetic oxygen release system is formed in the intermediate fiber layer, and at the same time, the fiber core can serve as a sensing system, and therefore, by means of the above structure and the formulation of each of the layers, the sensing system and the photosynthetic oxygen release system can be simultaneously and independently formed in a unified hydrogel optical fiber. The sensing system and the oxygen release system have low sensitivity to a light source required by each other, and therefore, mutual influence factors during use can be reduced. An optical fiber structure can be used in cooperation with the oxygen sensor to realize the real-time detection of oxygen contents in different regions of brain tissue, and also has the function of continuous and controllable direct oxygen supply.

DETAILED DESCRIPTION

The inventive thinking of this application is as follows. At present, optical oxygen sensors used for human tissue detection are mainly divided into a wearable type, an injection type, an implantable type and an interventional type. A wearable sensor can rapidly detect an oxygen content in human tissue through skin tissue in a non-invasive way by using flexible materials under the action of an exogenous light. Some studies have shown that an oxygen content of cerebral cortex decreases with the increase of depth. However, the wearable sensor is limited by the depth of a target biological tissue, and is only suitable for the oxygen content detection of a shallow tissue, which makes the exogenous light cannot be accurately located in human tissue.

An injection sensor is to inject a flexible sensor containing a fluorescent/phosphorescent oxygen probe into a target biological tissue, and uses an external light source and external wireless detection equipment to realize the determination of an oxygen content in human tissue. Although this method can realize the accurate positioning in tissues, the detection relies on the direct irradiation of human tissues with an exogenous light, and most of the exogenous light is scattered or absorbed by the human tissue according to the Lambert-Beer law, thereby affecting the accuracy of optical detection, and the skin tissue is easily injured by long-term or high-intensity light radiation, causing side effects. It has been reported that an implantable sensor can be constructed if a light source, an image processor, and a fluorescent probe are assembled integrally, and the sensor realizes the real-time detection of deep biological tissues by providing a light source in vivo. However, the safety and secondary operation of the implantable sensor still have challenges, especially in the terms of the long-term detection of brain tissue, so the injection and implantable sensors are not suitable for the long-term detection of brain tissue.

An interventional sensor mainly use the optical fiber technology to insert a sensor into a tissue in a minimally invasive way, and transmit an optical signal into the tissue in vitro to realize the detection of oxygen content in vivo. An optical fiber oxygen sensor is one of the commonly used sensors for detecting oxygen contents in deep tissues, and it is easy to be recovered quickly after use, to effectively avoid the risk caused by the secondary operation. For example, a Licox® brain tissue oxygen partial pressure monitor, a miniature intracranial multi-parameter sensor product on the basis of optical fiber sensing, uses the Clark dissolved oxygen electrode technology and is easily interfered by other gases and solvents during use.

In recent years, an optical fiber photochemical sensor has attracted more and more attention because of its high sensitivity and high selectivity. An oxygen content in brain tissue can be determined according to the change of fluorescence intensity or fluorescence lifetime by applying a fluorescence probe on one end of an optical fiber. The fluorescence chemical sensor can be continuously used for a long time after calibration once because it does not consume a substance to be detected, and has the advantages of high selectivity and sensitive reaction at the same time. However, the commonly used optical fiber material is made of glass or plastic, which is easy to cause injury to brain tissue, and its large size and mechanical properties are not suitable for the long-term use of flexible brain tissue. Therefore, how to construct a flexible optical fiber photochemical oxygen sensor is of great significance to realize the continuous real-time detection of oxygen contents in different regions of brain tissue.

Figure 1:
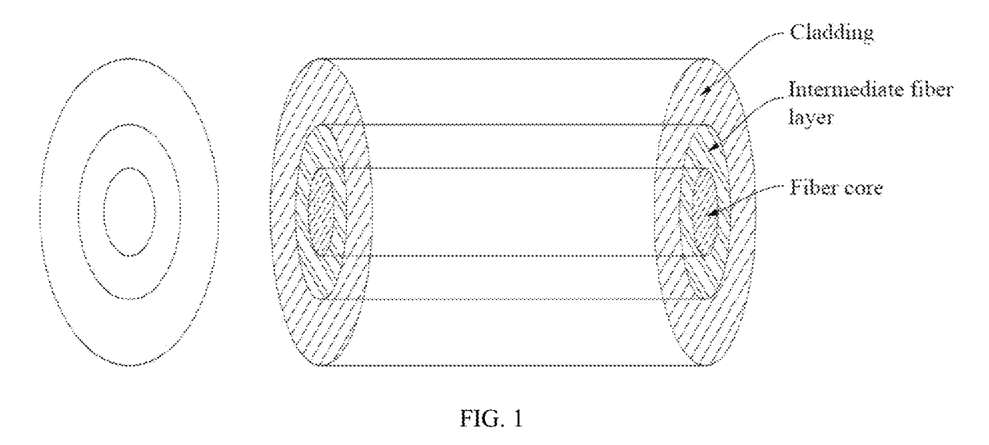
FIG. 1 is a schematic structural diagram of a bifunctional and flexible hydrogel optical fiber provided in Example 1 of this application.

As shown in FIG. 1, an example of this application provides a bifunctional and flexible hydrogel optical fiber, having a three-layer coaxial optical fiber structure formed by a fiber core, an intermediate fiber layer and a cladding. Raw materials of the fiber core include PEGDA, methacrylamide, HEMA and DMPA;

raw materials of the intermediate fiber layer include *Synechococcus* cells, PEGDA, GelMA, anhydrous strontium chloride and DMPA; and raw materials of the cladding include PEGDA, methacrylamide, sodium alginate and DMPA.

In some alternative implementations, the raw materials of the fiber core include, in mass fraction, 10%-40% of PEGDA, 30%-50% of methacrylamide, 10%-40% of HEMA, 0.3%-1.2% of DMPA, and the rest of ultrapure water.

In an example of this application, a specific mass fraction of methacrylamide is defined, and within the range of the mass fraction, the toxicity of methacrylamide to *Synechococcus* cells can be reduced.

A specific mass fraction of HEMA is defined, and within the range of the mass fraction, HEMA can enhance the mechanical properties and flexibility of the hydrogel optical fiber.

In summary, specific raw materials of the fiber core are defined, so that the fiber core has a good signal transmission function; and at the same time, DMPA serves as a photoinitiator, so that an optical fiber sensor can be formed between the fiber core and an oxygen sensing membrane, and a sensing system can be composed, and an oxygen content of brain tissue can be detected in real time.

In some alternative implementations, the raw materials of the intermediate fiber layer include, in mass fraction: 0.3%-3% of *Synechococcus* cells, 10%-30% of PEGDA, 10%-50% of GelMA, 0.5%-3% of anhydrous strontium chloride, 0.3%-1.2% of DMPA, and the rest of ultrapure water.

In an example of this application, a specific mass fraction of the *Synechococcus* cells is defined, and within the range of the mass fraction, the *Synechococcus* cells can quickly perform photosynthesis to release oxygen in the hydrogel optical fiber.

A specific mass fraction of PEGDA is defined, and within the range of the mass fraction, PEGDA can enhance the mechanical properties of the hydrogel optical fiber.

A specific mass fraction of methacrylamide is defined, and within the range of the mass fraction, the toxicity of methacrylamide to the *Synechococcus* cells can be reduced.

A specific mass fraction of GelMA is defined, and within the range of the mass fraction, the GelMA has good biocompatibility.

A specific mass fraction of anhydrous strontium chloride is defined, and within the range of the mass fraction, the anhydrous strontium chloride can increase the ionic cross-linking between each of materials and sodium alginate, increase the mechanical properties of the hydrogel optical fiber and reduce a refractive index.

A specific mass fraction of DMPA is defined, and within the range of the mass fraction, DMPA can initiate the crosslinking of free radicals to facilitate the formation of the hydrogel optical fiber.

In summary, specific raw materials of the intermediate fiber layer are defined. Photosynthetic cells such as *Synechococcus* cells are introduced, and combined with anhydrous strontium chloride, PEGDA, methacrylamide, GelMA and DMPA, so that the *Synechococcus* cells can be fixed in the intermediate fiber layer, and the long-term biological activity of the *Synechococcus* cells can be maintained. A photosynthetic oxygen release process of the *Synechococcus* cells can be controlled by controlling a dark time and a light intensity, to realize the continuous and controllable release oxygen function of the intermediate fiber layer, and a photosynthetic oxygen release system is formed in the optical fiber.

It is noted that the *Synechococcus* cell may be the *Synechococcus* 706 in the algae species bank of the Chinese Academy of Sciences.

In some alternative implementations, the raw materials of the cladding include, in mass fraction: 10%-30% of PEGDA, 5%-20% of methacrylamide, 1%-2% of sodium alginate, 0.3%-1.2% of DMPA, and the rest of ultrapure water.

In an example of this application, specific raw materials of the cladding are defined. A component of sodium alginate is introduced, so that the cladding has good biocompatibility and hydrophilicity. The hydrophilicity can maintain the activity of photosynthetic cells for a long time and enable the free transport of oxygen molecules in the photosynthetic oxygen release system.

In some alternative implementations, a thickness ratio of the fiber core, the intermediate fiber layer, and the cladding is 1-3:1-3:1-3.

In an example of this application, a specific thickness ratio of the fiber core, the intermediate fiber layer and the cladding is defined. The fiber core can have a good signal transmission effect through the thickness ratio; and at the same time, the intermediate fiber layer can have a good photosynthetic oxygen release effect, to realize the real-time detection of oxygen contents in different areas of brain tissue in cooperation with the oxygen sensor, and the function of continuous and controllable direct oxygen supply is provided.

Figure 2:
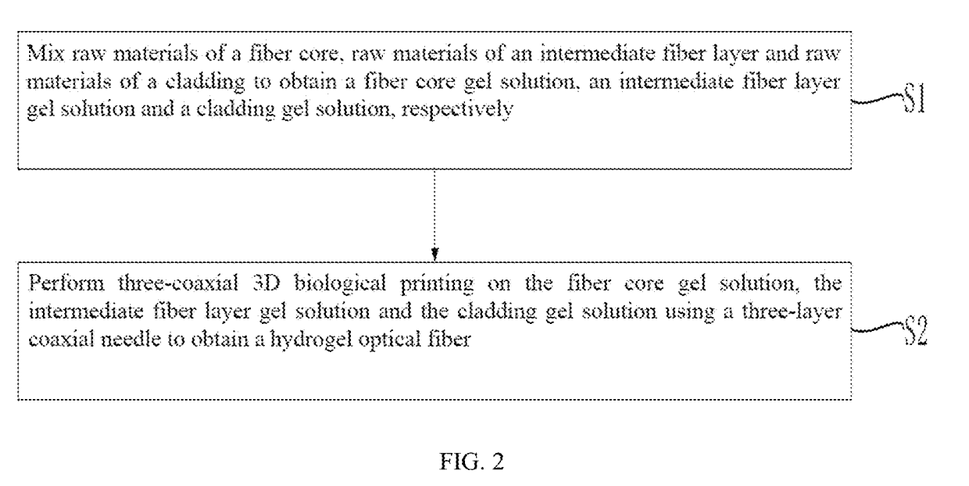
FIG. 2 is a schematic flow chart of a preparation method for the hydrogel optical fiber provided in Example 1 of this application.

As shown in FIG. 2, on the basis of one general inventive concept, an example of this application provides a preparation method for a hydrogel optical fiber, including the following steps.

In S1: raw materials of a fiber core, raw materials of an intermediate fiber layer and raw materials of a cladding are mixed to obtain a fiber core gel solution, an intermediate fiber layer gel solution and a cladding gel solution, respectively.

In S2: three-coaxial 3D biological printing is performed on the fiber core gel solution, the intermediate fiber layer gel solution and the cladding gel solution using a three-layer coaxial needle to obtain a hydrogel optical fiber.

The method is directed to a preparation method for the above hydrogel optical fiber. A specific structure and composition of the hydrogel optical fiber can be referred to the above examples. Since the method adopts some or all of the technical solutions of the above examples, at least all the beneficial effects brought about by the technical solutions of the above examples will not be described in detail herein.

Figure 3A:
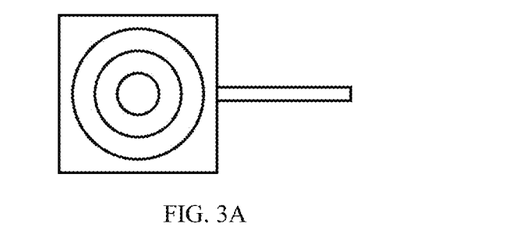
FIG. 3A is a top view of a three-layer coaxial needle provided in an example of this application.
Figure 3B:
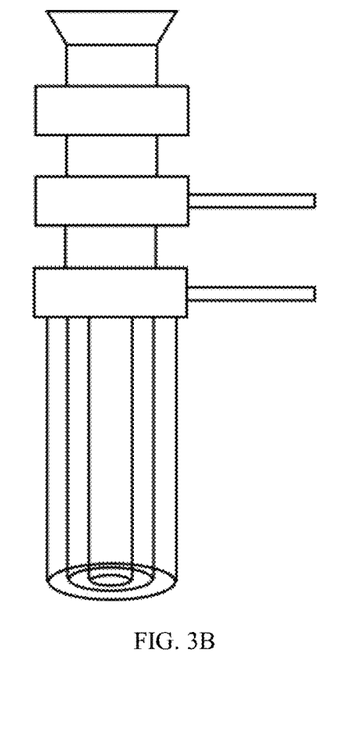
FIG. 3B is a front view of the three-layer coaxial needle provided in an example of this application.

It is noted that a specific structure of the three-layer coaxial needle is as shown in FIG. 3, and a three-layer coaxial optical fiber structure can be obtained by using a 12 G needle as a fiber core channel, a 10 G needle as an intermediate fiber core channel and a 8 G gun head as a cladding channel.

On the basis of one general inventive concept, an example of this application provides a bifunctional and flexible hydrogel optical fiber sensor, including a hydrogel optical fiber, and an oxygen sensing membrane connected to one end of the hydrogel optical fiber.

The hydrogel optical fiber sensor is realized on the basis of the above hydrogel optical fiber. The specific structure and composition of the hydrogel optical fiber sensor can be referred to the above examples. Since the hydrogel optical fiber sensor adopts some or all of the technical solutions of the above examples, at least all the beneficial effects brought about by the technical solutions of the above examples will not be described in detail herein.

Figure 4:
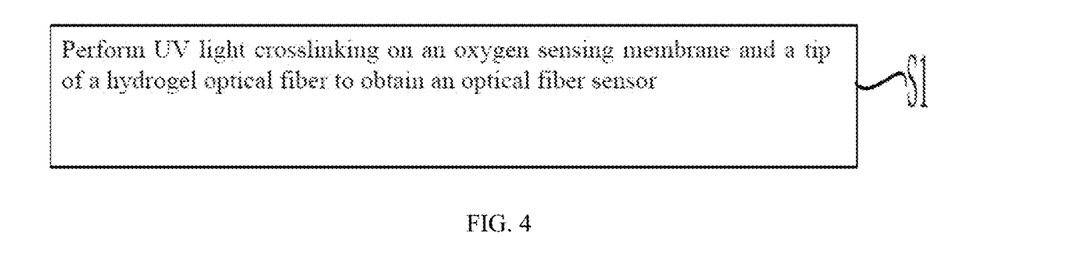
FIG. 4 is a schematic flow chart of a preparation method for an optical fiber sensor provided in Example 2 of this application.

As shown in FIG. 4, on the basis of one general inventive concept, an example of this application provides a preparation method for an optical fiber sensor, including the following step.

In S1: UV light crosslinking is performed on an oxygen sensing membrane and a tip of a hydrogel optical fiber to obtain an optical fiber sensor.

The method is directed to a preparation method for the above optical fiber sensor. A specific composition of the optical fiber sensor can be referred to the above examples. Since the method adopts some or all of the technical solutions of the above examples, at least all the beneficial effects brought about by the technical solutions of the above examples will not be described in detail herein.

It is noted that a raw material of the oxygen sensing membrane may be PDMS supported PtOEP, or other commonly used oxygen sensing membrane materials.

Figure 5:
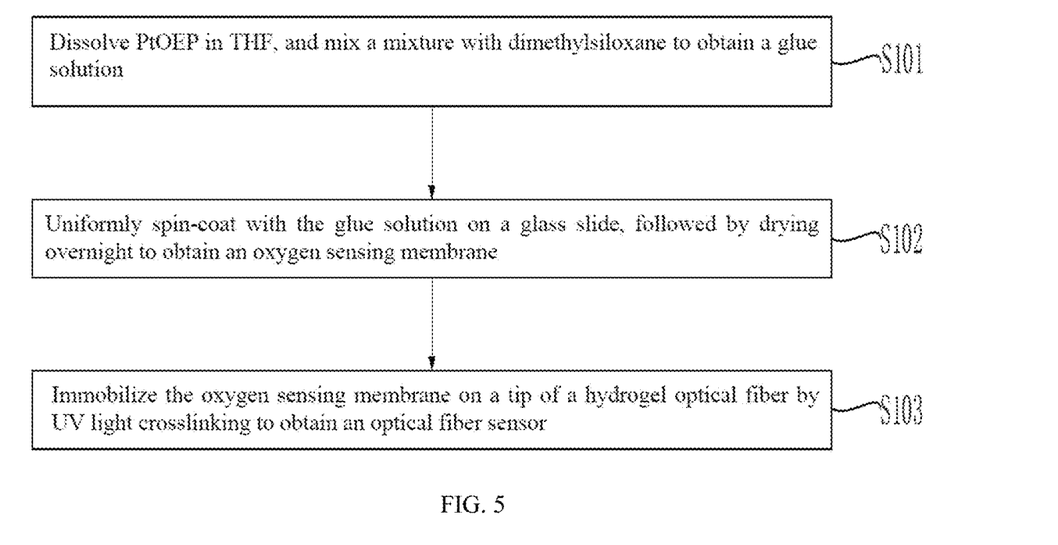
FIG. 5 is a schematic flow chart of a detailed preparation method for an optical fiber sensor provided in Example 2 of this application.

It is to be noted that in some alternative implementations, as shown in FIG. 5, UV light crosslinking is performed on an oxygen sensing membrane and a tip of a hydrogel optical fiber to obtain an optical fiber sensor, including the following steps.

In S101: PtOEP is dissolved in tetrahydrofuran (THF) and mixed with dimethylsiloxane to obtain a glue solution.

In S102: a glass slide is uniformly spin-coated with the glue solution, followed by drying overnight to obtain an oxygen sensing membrane.

In S103: the oxygen sensing membrane is immobilized on a tip of a hydrogel optical fiber by UV light crosslinking to obtain an optical fiber sensor.

A specific method of UV light crosslinking is refined, and PDMS supported PtOEP is used as an oxygen sensing membrane to detect an oxygen content in brain tissue in real-time and accurately.

Figure 6A:
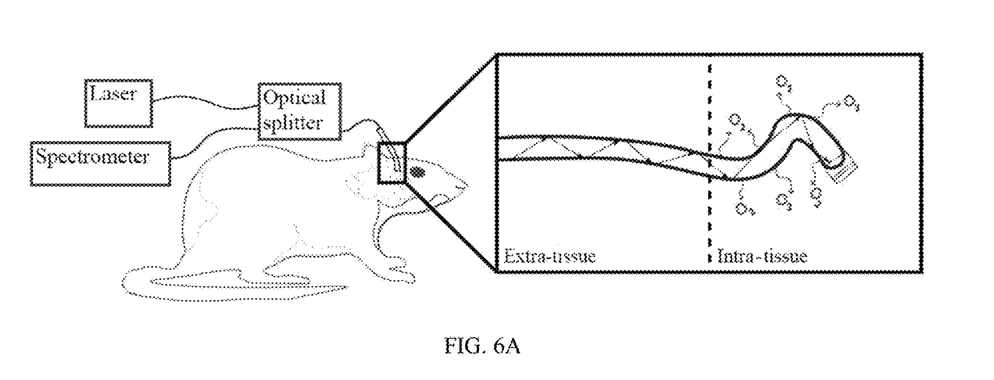
FIG. 6A is an example of an application of a real-time detection system for an oxygen content provided in Example 3 of this application on a mouse.
Figure 6B:
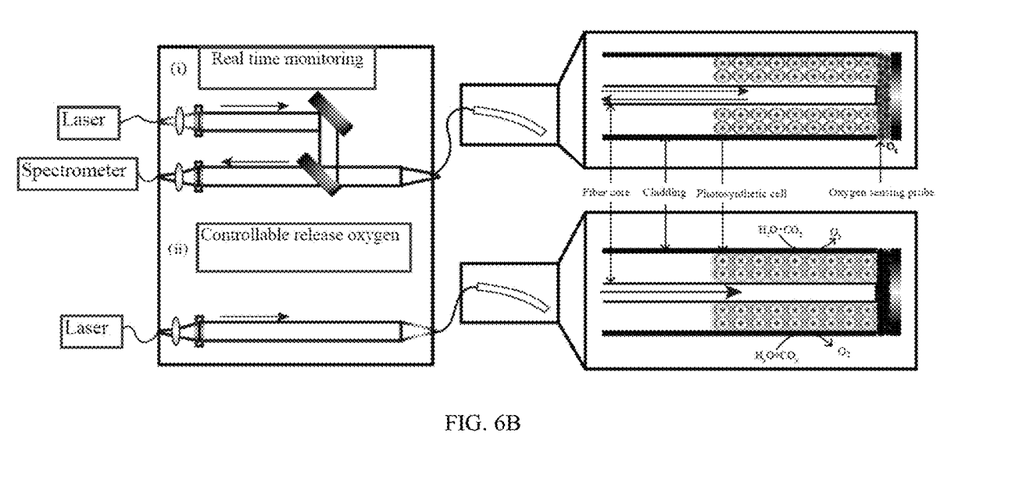
FIG. 6B is a schematic structural diagram of the real-time detection system for an oxygen content provided in Example 3 of this application.

As shown in FIG. 6, on the basis of one general inventive concept, an example of this application provides a real-time detection system for an oxygen content, including a fluorescence detection device and an optical fiber sensor, the fluorescence detection device being fixedly connected to the optical fiber sensor.

The real-time detection system for an oxygen content is realized on the basis of the above optical fiber sensor. A specific structure of the optical fiber sensor can be referred to the above examples. Since the real-time detection system for an oxygen content adopts some or all of the technical solutions of the above examples, at least all the beneficial effects brought about by the technical solutions of the above examples will not be described in detail herein.

In some alternative implementations, the fluorescence detection device includes an optical splitter, a light source and a spectrometer,
  the optical splitter including a first interface, a second interface and a third interface, the first interface being communicated with the light source to realize the excitation of a green light source or a red light source;
  the second interface being connected to the spectrometer to detect an intensity of an emitted light; and
  the third interface being connected to the optical fiber sensor.

In an example of this application, the release of oxygen and the detection of oxygen content in the tissue can be controlled by using the change of a light source in a fluorescence detection device. A specific process is as follows.

When a green light source (532 nm) is adopted, an oxygen probe (oxygen sensing membrane) immobilized on the tip of the hydrogel optical fiber can be excited, and at the same time, an optical signal is collected in vitro by an optical splitter 5 to realize the detection of oxygen content in the tissue.

When a red light source (635 nm) is adopted, a light source 4 is adjusted to realize the regulation of a photosynthetic oxygen release process of *Synechococcus* cells, and at the same time, the hydrogel can maintain the activity of and oxygen release ability of photosynthetic cells to realize continuous oxygen supply in the tissue.

By introducing a common intelligent control module, the detection system can replenish a dissolved oxygen level when a level below a predetermined threshold is detected, and at the same time, a light signal can be modulated by using an artificial intelligence (AI), the light source and wavelength are adjusted to realize the optimal detection and response to changes in the dissolved oxygen level.

Hereinafter, this application is further elaborated in connection with specific examples. It is to be understood that these examples are for illustrative purposes only and are not intended to limit the scope of this application. Specific conditions of the experimental method are not specified in the following examples, and are usually determined according to national standards. If there is no corresponding national standard, it is to be performed according to the general international standards, conventional conditions or the conditions suggested by manufacturers.

Example 1

A preparation method for a hydrogel optical fiber includes the following.

As shown in FIG. 6, the used raw materials of a fiber core included: 25% of PEGDA, 40% of methacrylamide, 30% of HEMA, 1.0% of DMPA and 4% of ultrapure water;
  raw materials of an intermediate fiber layer included: 2% of *Synechococcus* cells, 20% of PEGDA, 30% of GelMA, 2% of anhydrous strontium chloride, 0.5% of DMPA and 47.5% of ultrapure water; and
  raw materials of a cladding included: 20% of PEGDA, 10% of methacrylamide, 1.5% of sodium alginate, 1% of DMPA and 67.5% of ultrapure water.

3D biological printing was performed on a 3D printing platform using a three-layer coaxial needle as shown in FIG. 3 to obtain a three-layer hydrogel optical fiber.

Example 2

On the basis of the hydrogel optical fiber obtained in Example 1, further preparation was performed.

A preparation method for an optical fiber sensor included the following steps.

PtOEP was dissolved in THF and uniformly mixed with PDMS by using a homogenizer, a glass slide was uniformly spin-coated with a solution, placed in an oven at 60° C., and dried overnight to obtain a finished product of an oxygen sensing membrane.

The oxygen sensing membrane was immobilized on a tip of the hydrogel optical fiber by UV light (0.5 W·cm$^{-2}$) crosslinking to obtain an optical fiber sensor.

Example 3

On the basis of the optical fiber sensor obtained in Example 2, further preparation was performed.

As shown in FIG. 6, a real-time detection system for an oxygen content included a fluorescence detection device and an optical fiber sensor, the fluorescence detection device being fixedly connected to the optical fiber sensor, and the fluorescence detection device including an optical splitter, a light source and a spectrometer;
  the optical splitter including a first interface, a second interface and a third interface, the first interface being communicated with a light source to realize the excitation of a green light source or a red light source;
  the second interface being connected to the spectrometer to detect an intensity of an emitted light; and
  the third interface being connected to the optical fiber sensor.

When a green light source (532 nm) was adopted, an oxygen probe (oxygen sensing membrane) immobilized on the tip of the hydrogel optical fiber could be excited, and at the same time, an optical signal was collected in vitro by an optical splitter to realize the detection of oxygen content in the tissue.

When a red light source (635 nm) was adopted, a light source was adjusted to realize the regulation of a photosynthetic oxygen release process of *Synechococcus* cells, and at the same time, the hydrogel could maintain the activity of and oxygen release ability of photosynthetic cells to realize continuous oxygen supply in the tissue.

Example 4

Comparing Example 4 with Example 1, the differences between Example 4 and Example 1 were as follows.

The used raw materials of a fiber core included: 10% of PEGDA, 30% of methacrylamide, 40% of HEMA, 0.3% of DMPA and 19.7% of ultrapure water;
  raw materials of an intermediate fiber layer included: 0.3% of *Synechococcus* cells, 10% of PEGDA, 50% of GelMA, 3% of anhydrous strontium chloride, 0.3% of DMPA and 36.4% of ultrapure water; and
  raw materials of a cladding included: 10% of PEGDA, 20% of methacrylamide, 2% of sodium alginate, 1.2% of DMPA and 66.8% of ultrapure water.

Example 5

Comparing Example 5 with Example 1, the differences between Example 5 and Example 1 were as follows:
  the used raw materials of a fiber core included: 40% of PEGDA, 45% of methacrylamide, 10% of HEMA, 1.2% of DMPA and 3.8% of ultrapure water;
  raw materials of an intermediate fiber layer included: 3% of *Synechococcus* cells, 30% of PEGDA, 10% of GelMA, 0.5% of anhydrous strontium chloride, 1.2% of DMPA and 58.3% of ultrapure water; and
  raw materials of a cladding included: 30% of PEGDA, 5% of methacrylamide, 1% of sodium alginate, 0.3% of DMPA and 63.7% of ultrapure water.

Relevant experimental and effect data are as follows.

Figure 7:
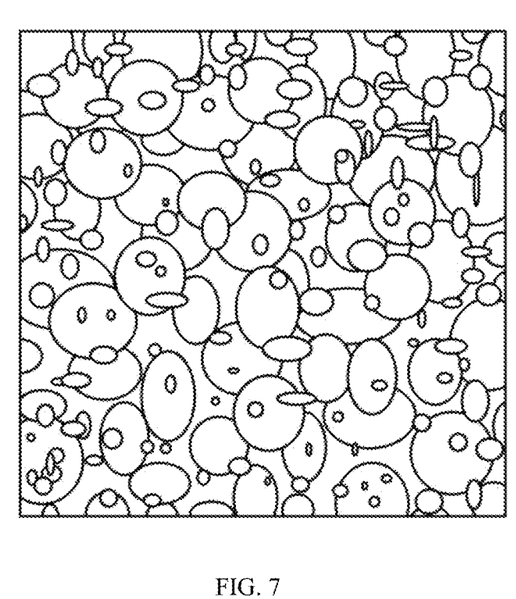
FIG. 7 is a schematic diagram of cross-sectional structures of each of layers of the hydrogel optical fiber provided in Example 1 of this application.
Figure 8:
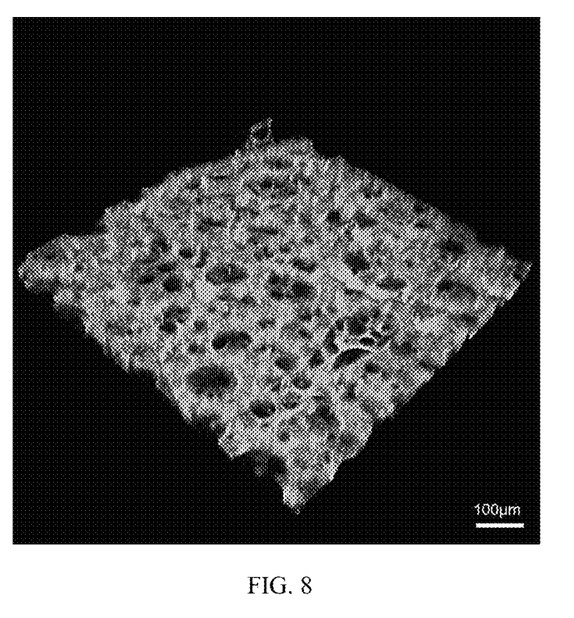
FIG. 8 is a 3D schematic diagram of a single confocal intermediate fiber layer in the hydrogel optical fiber provided in Example 1 of this application.
Figure 9:
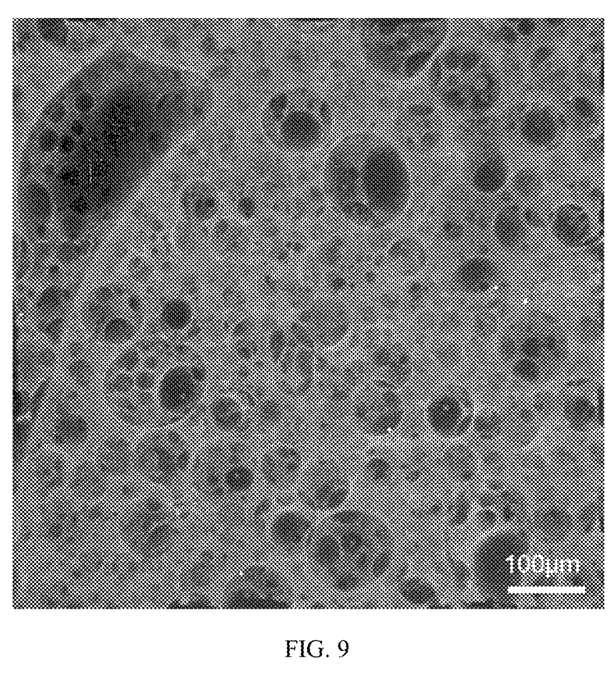
FIG. 9 is a top view of the single confocal intermediate fiber layer in the hydrogel optical fiber provided in Example 1 of this application.
Figure 10A:
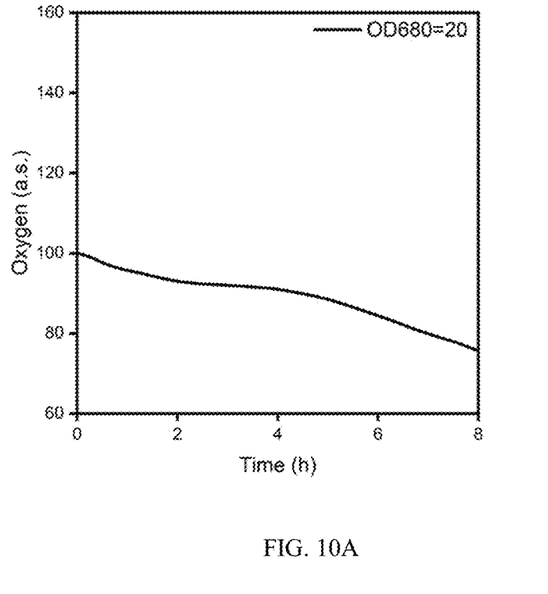
FIG. 10A is an oxygen release result diagram of *Synechococcus* cells at a concentration of $40 \times 10^7$ cells/mL in the optical fiber sensor provided in Example 2 of this application.
Figure 10B:
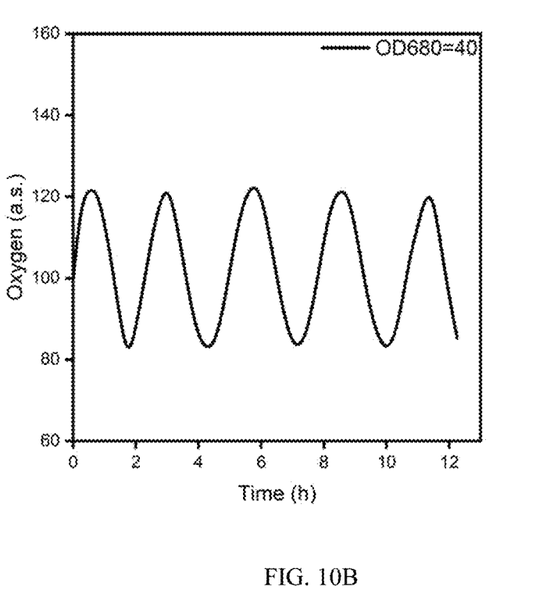
FIG. 10B is an oxygen release result diagram of the *Synechococcus* cells at a concentration of $80 \times 10^7$ cells/mL in the optical fiber sensor provided in Example 2 of this application.
Figure 10C:
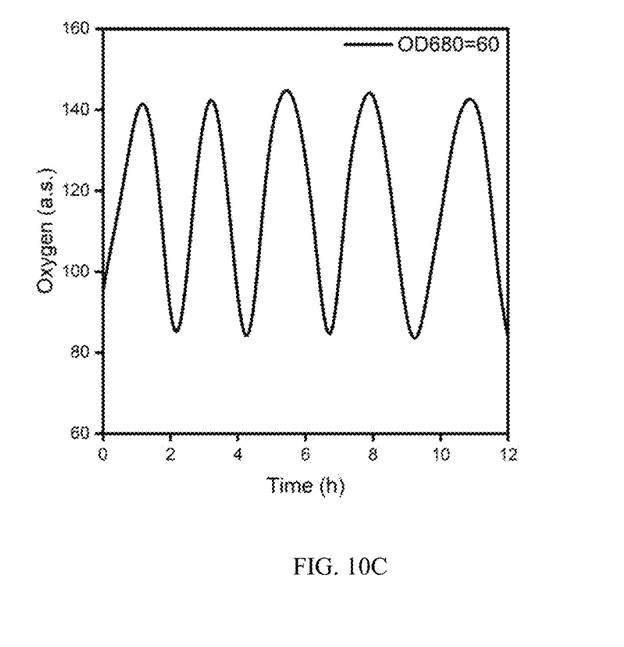
FIG. 10C is an oxygen release result diagram of the *Synechococcus* cells at a concentration of $120 \times 10^7$ cells/mL in the optical fiber sensor provided in Example 2 of this application.
Figure 10D:
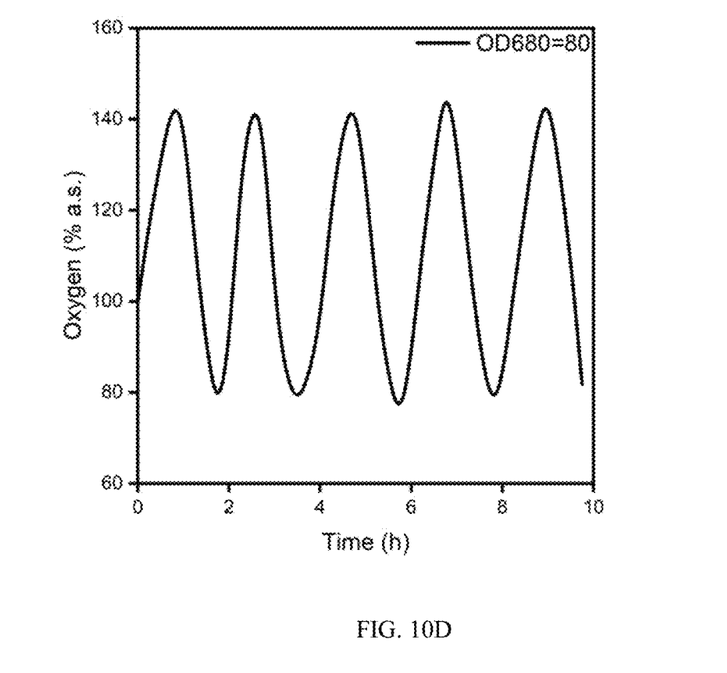
FIG. 10D is an oxygen release result diagram of the *Synechococcus* cells at a concentration of $160 \times 10^7$ cells/mL in the optical fiber sensor provided in Example 2 of this application.
Figure 10E:
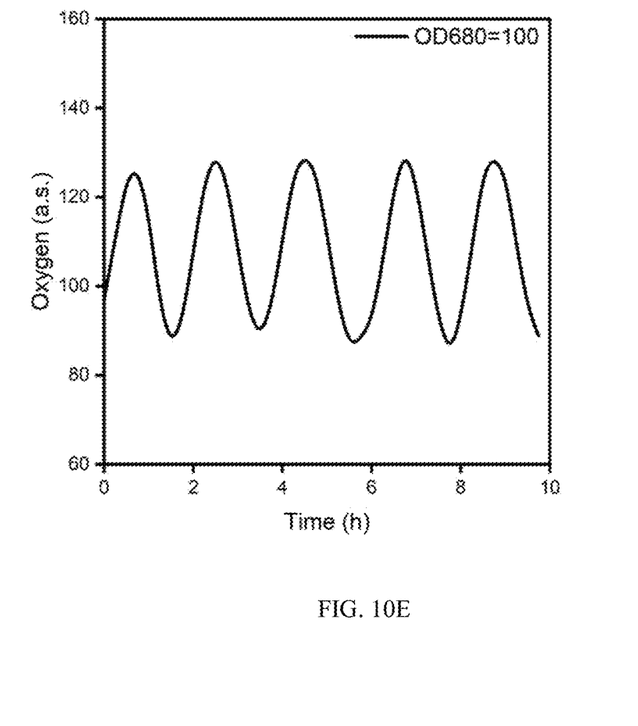
FIG. 10E is an oxygen release result diagram of the *Synechococcus* cells at a concentration of $200 \times 10^7$ cells/mL in the optical fiber sensor provided in Example 2 of this application.

A structure of the hydrogel optical fiber obtained in Example 1 is detected as shown in FIGS. 1 and 7. In FIG. 7, cells are not identified in a pore structure. Meanwhile, the hydrogel optical fiber is observed by a laser confocal microscope. A 3D rotation diagram of an observation result of the intermediate fiber layer is shown in FIG. 8, and a top view of the observation result is shown in FIG. 9.

An oxygen release rate detection is performed on the optical fiber sensor obtained in Example 2 under conditions of different cell numbers. A specific detection principle is as follows. An optical density (OD) value of the optical fiber sensor at a wavelength of 680 nm is detected. Since the intermediate fiber layer of the optical fiber sensor contains a large number of *Synechococcus* cells, and chlorophyll-a in the *Synechococcus* cells absorbs a part of light and produce oxygen to be released into a solution, affecting the OD value, parameters such as a cell density and the number of the *Synechococcus* cells can be roughly estimated by directly measuring the change of OD value. The specific steps are as follows.

1. A suitable conversion factor is determined, the conversion factor mainly representing the degree of correlation between a value of OD680 and the number of cells per milliliter. The conversion factors are different due to different species and growth conditions of *Synechococcus* cell strains. Therefore, a calibration experiment is performed on the selected *Synechococcus* cell strains (e.g. the *Synechococcus* 706 in the algae species bank of the Chinese Academy of Sciences) to determine a value of the suitable conversion factor.

(1) An OD value is measured at a wavelength of 680 nm using a culture solution of *Synechococcus* cells with known cell number.

(2) The number of *Synechococcus* cells is directly measured using a flow cytometer or a microscope.

(3) According to an OD680 value and the cell number, a value of conversion factor is obtained.

2. The value of conversion factor is substituted into the formula:

Cell number (cells/mL)=OD680 value*conversion coefficient.

The number of *Synechococcus* cells to be measured is calculated.

For example: a known cell number of *Synechococcus* cells is added to 100 ml of the culture solution, an OD680 value of the solution is measured to be 0.5, and the conversion factor is calculated to be $2 \times 10^7$.

*Synechococcus* cells in the optical fiber sensor obtained in Example 2 are measured by the above method, and the results are shown in FIG. 10, indicating that the optical fiber sensor has a short oxygen release time and a fast oxygen release rate on the premise that an optical wavelength OD680 is 80 (an conversion coefficient is $2 \times 10^7$ and the number of *Synechococcus* cells is $160 \times 10^7$/mL).

In summary, the example of this application provides a bifunctional and flexible hydrogel optical fiber, which can independently construct a sensing system and an oxygen release system together, and the photosynthetic oxygen release system and the detection system have low sensitivity to the light source required by each other, thereby reducing mutual influencing factors during use.

Meanwhile, compared with the traditional optical fiber sensing material, the hydrogel optical fiber not only has good optical transparency and biocompatibility, but also has good hydrophilicity. The hydrophilicity can maintain the activity of photosynthetic cells for a long time and enable the free transport of oxygen molecules.

Moreover, the hydrogel optical fiber can be rapidly removed and recovered from the body due to its high biocompatibility, and can be reused to avoid the injury caused by the second operation.

The real-time detection system for an oxygen content provided in the example of this application can effectively realize the continuous and controllable oxygen release by controlling a dark time and a light intensity since the continuous and controllable oxygen release function is realized by the photosynthetic cells-*Synechococcus* cells fixed in the hydrogel optical fiber.

Various examples of this application may exist in one range form. It is to be understood that the description in one range form is merely for convenience and brevity, and is not to be construed as an inflexible limitation on the scope of this application. Therefore, the description of the range is to be considered to have specifically disclosed all the possible subranges as well as individual numerical values within the range. For example, a description of a range from 1 to 6 is to be considered to have specifically disclosed subranges, such as from 1 to 3, from 1 to 4, from 1 to 5, from 2 to 4, from 2 to 6, and from 3 to 6, as well as individual numbers within the range, such as 1, 2, 3, 4, 5, and 6, apply regardless of the scope. Further, whenever a numerical range is indicated herein, it refers to including any cited number (fractional or integral) within an indicated range.

In this application, the directional words used such as "upper" and "lower" when not stated to the contrary, specifically refer to the directions of the drawing in the attached drawings. In addition, in the description of the specification of this application, terms "including", "containing" and the like mean "including but not limited to". In this specification, relational terms such as "first" and "second" are only used to distinguish one entity or operation from another entity or operation, and do not necessarily require or imply that there is any such an actual relationship or order between these entities or operations. Herein, "and/or", describing an associated relationship of associated objects, means that three relationships may exist, for example, A and/or B may mean: A exists alone, A and B exist together, and B exists alone, where A and B may be singular or plural. Herein, "at least one" refers to one or more, and "a plurality of" refers to two or more. "At least one", "at least one of", or the like, refers to any combination of these items, including single items or any combination of plural items. For example, "at least one of a, b, or c", or, "at least one of a, b, and c" may represent: a, b, c, a-b (i.e. a and b), a-c, b-c, or a-b-c, where a, b, or c may be single or plural.

The invention claimed is:

1. A bifunctional and flexible hydrogel optical fiber, having a three-layer coaxial optical fiber structure formed by a fiber core, an intermediate fiber layer and a cladding, raw materials of the fiber core comprising polyethylene glycol diacrylate (PEGDA), methacrylamide, 2-hydroxyethyl methacrylate (HEMA) and 2,2-diethoxy-phenylacetophenone (DMPA);

raw materials of the intermediate fiber layer comprising *Synechococcus* cells, PEGDA, gelatin methacrylate (GelMA), anhydrous strontium chloride and DMPA; and raw materials of the cladding comprising PEGDA, methacrylamide, sodium alginate and DMPA.

2. The hydrogel optical fiber according to claim 1, wherein the raw materials of the fiber core comprise, in mass fraction, 10%-40% of PEGDA, 30%-50% of methacrylamide, 10%-40% of HEMA, 0.3%-1.2% of DMPA, and the rest of ultrapure water.

3. The hydrogel optical fiber according to claim 1, wherein the raw materials of the intermediate fiber layer comprise, in mass fraction: 0.3%-3% of *Synechococcus* cells, 10%-30% of PEGDA, 10%-50% of GelMA, 0.5%-3% of anhydrous strontium chloride, 0.3%-1.2% of DMPA, and the rest of ultrapure water.

4. The hydrogel optical fiber according to claim 1, wherein the raw materials of the cladding comprise, in mass fraction: 10%-30% of PEGDA, 5%-20% of methacrylamide, 1%-2% of sodium alginate, 0.3%-1.2% of DMPA, and the rest of ultrapure water.

5. The hydrogel optical fiber according to claim 1, wherein a thickness ratio of the fiber core, the intermediate fiber layer, and the cladding is 1-3:1-3:1-3.

6. A preparation method for a hydrogel optical fiber according to claim 1, comprising the steps of:

mixing raw materials of a fiber core, raw materials of an intermediate fiber layer and raw materials of a cladding to obtain a fiber core gel solution, an intermediate fiber layer gel solution and a cladding gel solution, respectively; and performing three-coaxial 3D biological printing on the fiber core gel solution, the intermediate fiber layer gel solution and the cladding gel solution using a three-layer coaxial needle to obtain a hydrogel optical fiber.

7. A preparation method for a hydrogel optical fiber according to claim 2, comprising the steps of:

mixing raw materials of a fiber core, raw materials of an intermediate fiber layer and raw materials of a cladding to obtain a fiber core gel solution, an intermediate fiber layer gel solution and a cladding gel solution, respectively; and performing three-coaxial 3D biological printing on the fiber core gel solution, the intermediate fiber layer gel solution and the cladding gel solution using a three-layer coaxial needle to obtain a hydrogel optical fiber.

8. A preparation method for a hydrogel optical fiber according to claim 3, comprising the steps of:

mixing raw materials of a fiber core, raw materials of an intermediate fiber layer and raw materials of a cladding to obtain a fiber core gel solution, an intermediate fiber layer gel solution and a cladding gel solution, respectively; and performing three-coaxial 3D biological printing on the fiber core gel solution, the intermediate fiber layer gel solution and the cladding gel solution using a three-layer coaxial needle to obtain a hydrogel optical fiber.

9. A preparation method for a hydrogel optical fiber according to claim 4, comprising the steps of:

mixing raw materials of a fiber core, raw materials of an intermediate fiber layer and raw materials of a cladding to obtain a fiber core gel solution, an intermediate fiber layer gel solution and a cladding gel solution, respectively; and performing three-coaxial 3D biological printing on the fiber core gel solution, the intermediate fiber layer gel solution and the cladding gel solution using a three-layer coaxial needle to obtain a hydrogel optical fiber.

10. A preparation method for a hydrogel optical fiber according to claim 5, comprising the steps of:

mixing raw materials of a fiber core, raw materials of an intermediate fiber layer and raw materials of a cladding to obtain a fiber core gel solution, an intermediate fiber layer gel solution and a cladding gel solution, respectively; and performing three-coaxial 3D biological printing on the fiber core gel solution, the intermediate fiber layer gel solution and the cladding gel solution using a three-layer coaxial needle to obtain a hydrogel optical fiber.

11. A bifunctional and flexible hydrogel optical fiber sensor, comprising a hydrogel optical fiber according to claim 1, and an oxygen sensing membrane connected to one end of the hydrogel optical fiber.

12. A bifunctional and flexible hydrogel optical fiber sensor, comprising a hydrogel optical fiber according to claim 2, and an oxygen sensing membrane connected to one end of the hydrogel optical fiber.

13. A bifunctional and flexible hydrogel optical fiber sensor, comprising a hydrogel optical fiber according to claim 3, and an oxygen sensing membrane connected to one end of the hydrogel optical fiber.

14. A bifunctional and flexible hydrogel optical fiber sensor, comprising a hydrogel optical fiber according to claim 4, and an oxygen sensing membrane connected to one end of the hydrogel optical fiber.

15. A bifunctional and flexible hydrogel optical fiber sensor, comprising a hydrogel optical fiber according to claim 5, and an oxygen sensing membrane connected to one end of the hydrogel optical fiber.

16. A preparation method for an optical fiber sensor according to claim 11, comprising:

performing ultraviolet (UV) light crosslinking on an oxygen sensing membrane and a tip of a hydrogel optical fiber to obtain an optical fiber sensor.

17. A preparation method for an optical fiber sensor according to claim 12, comprising:

performing ultraviolet (UV) light crosslinking on an oxygen sensing membrane and a tip of a hydrogel optical fiber to obtain an optical fiber sensor.

18. A preparation method for an optical fiber sensor according to claim 13, comprising:

performing ultraviolet (UV) light crosslinking on an oxygen sensing membrane and a tip of a hydrogel optical fiber to obtain an optical fiber sensor.

19. A real-time detection system for an oxygen content, comprising a fluorescence detection device and an optical fiber sensor according to claim 11, the fluorescence detection device being fixedly connected to the optical fiber sensor.

20. The detection system according to claim 19, wherein the fluorescence detection device comprises an optical splitter, a light source and a spectrometer, the optical splitter comprising a first interface, a second interface and a third interface, the first interface being communicated with the light source to realize the excitation of a green light source or a red light source;

the second interface being connected to the spectrometer to detect an intensity of an emitted light; and the third interface being connected to the optical fiber sensor.

* * * * *